Jan. 18, 1949.　　　T. Q. SMITH　　　2,459,757
CAMELBACK MATERIAL
Filed July 9, 1946
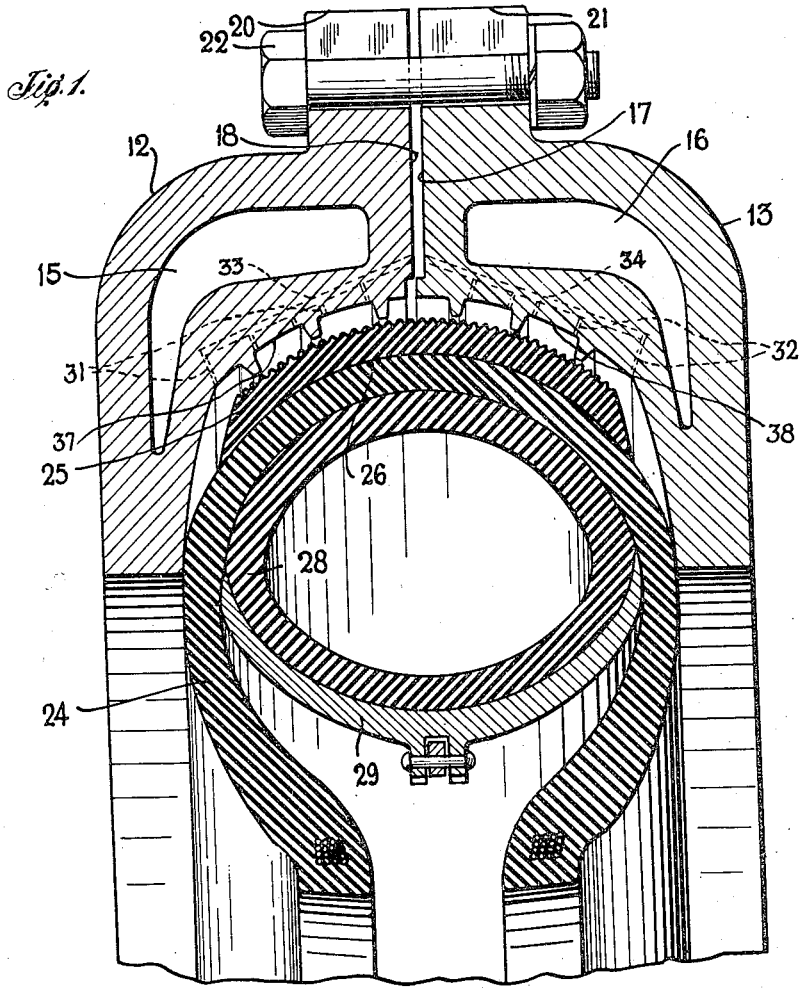
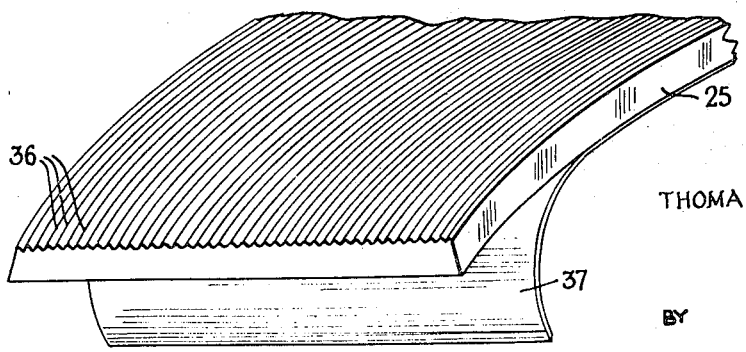
INVENTOR
THOMAS Q. SMITH
BY Ely & Frye
ATTORNEYS Patented Jan. 18, 1949

2,459,757

UNITED STATES PATENT OFFICE 2,459,757

CAMELBACK MATERIAL

Thomas Q. Smith, Akron, Ohio, assignor to The Firestone Tire & Rubber Company, Akron, Ohio, a corporation of Ohio Application July 9, 1946, Serial No. 682,201

5 Claims. (Cl. 152—187)

This invention relates generally to improvements in the rebuilding of tires; more specifically to an improved tire retread material of the type commonly termed "camelback."

The application of camelback for the purpose of building up the tread thickness of pneumatic tires which have had considerable tread wear, is a well-known practice. This general procedure is normally termed "retreading" or "recapping" dependent upon the extent to which the retread material is applied to a worn or used tire. The uncured or partially uncured rubber or rubber-like composition which is used for this purpose is normally sold by the rubber manufacturer in the form of elongated sheets which vary in width in conformance with their intended use, the sheets being either approximately equal to the circumference of the tire intended to receive the specific material, or comprising continuous stock from which the desired lengths may be cut. Camelback heretofore provided tire retreaders for the above purpose comprised a ribbon-like stripping having planate top and bottom surfaces, at least one of which was normally protected against dirt and loss of tack by the application of a removable fabric such as holland cloth, which extended completely over the surface and which was adapted for easy removal just before placing the camelback on the tire. In the normal retread operation, the tread surface of the tire to be retreaded is buffed, cleaned, and coated on the buffed surface with a rubber composition dissolved in a highly volatile solvent.

A primary object is to provide a tire retread material which will facilitate the escape of air from the tread forming region of a retread mold. A further object corollary thereto is to insure quicker and more positive flow of material when subjected to heating and to the compressive forces attendant the application of the camelback to the tire by means of the conventional retread mold. A further object is to reduce the time required to obtain proper curing of the camelback and adhesion of the same to the surface of the tire which has been prepared to receive the camelback.

A still further object of the invention is to provide an improved camelback which is adapted for use in the retreading of tires, the design of one surface of said camelback being such as to render unnecessary the use of a dusting material which is normally used to promote escapement of air from the mold.

Other advantages of the present invention will become apparent to a person skilled in the art upon an examination of the drawings, the specification and the attendant claims. In the drawing:

Fig. 1 is a fragmentary view in vertical cross-section through a conventional retread mold, showing the application of the improved camelback material in position for complete closure of the mold which is shown partially open for illustrative purposes;

Fig. 2 is a fragmentary view in perspective showing the improved camelback, comprising the present invention.

Referring specifically to Fig. 1 of the drawing, a conventional retread mold comprises a pair of cylindrical tread forming members 12 and 13 having interior annular jackets 15 and 16, respectively, adapted to receive and retain a hot gas or liquid under pressure. During the tread forming period, the tread forming members 12 and 13 are held in clamped engagement with surfaces 17 and 18 clamped face to face by a plurality of bolts, such as bolt 22, shown projecting through lugs 20 and 21 on opposing tread-forming members. The tread-forming members 12 and 13 are adapted to receive only the portion of the tire to which the camelback is to be applied, with substantial sidewall areas of the tire remaining unenclosed thereby. In retreading practice it is preferred to restrict heating substantially to the tread portion of the tire, since excessive heating of the sidewall ply structure will result in over-vulcanization of the rubber with attendant danger that the finished retreaded tire will be structurally weakened.

In the type of collapsible rim mold shown in Fig. 1 molding pressures and heating are restricted to the tread region of the tire. The tire body 24 with the strip of improved camelback 25 having circumferential contiguous ribs on its outer surface, is shown covering the tread region 26 of the tire. The assembly as shown by Fig. 1 is obtained by first applying the camelback to the tread portion of a cleaned and buffed tire body 24 and placing a curing bag 28 therein. A collapsible rim 29 of the type comprising hinged sections is placed within the tire 24 in collapsed condition, to be unfolded to form a continuous rim for support of the curing bag. The tire 24 containing curing bag 28 and rim 29 is then assembled in the mold, the tread forming elements of which are then clamped together.

With the mold apparatus completely assembled, air at approximately 100 pounds per square inch gage pressure is admitted into the curing bag 28. Steam or other heating means is admitted to annular pressuretight chambers 15 and 16, the heat thus applied being maintained for a curing cycle.

Escape of air from between the camelback under compression and the tread forming surfaces 37 and 38 of the mold is facilitated by holes 31, 31 and 32, 32 drilled into mold members 12 and 13, respectively, from the tread surfaces 37 and 38 to, and making approximately perpendicular junction therewith, holes 33 and 34 drilled from the butting surfaces 18 and 17, respectively, of mold members 12 and 13. The air venting arrangement just described occurs at perhaps ten or fifteen regular intervals about the circumference of the tread forming surface. The curing bag is then deflated and the molding apparatus is disassembled in the reverse order of the manner of assembling described above, to complete the retreading process.

The present invention relates primarily to the provision of an improved surface on the outer side of the camelback to allow maximum passage for air which tends to become entrapped between the camelback and the complementary mold surface during the tread-forming period. The resulting tread will be free from mold imperfections with consequent reduction in the number of imperfect applications or "seconds." Through the employment of a serrated surface greater freedom in the flow of the camelback material is obtained. The camelback material promptly fills the voids in the tread-forming part of the mold thus promoting uniform vulcanization in the various portions of the tread. When air is entrapped within tread-forming recesses of the mold, even for a minor portion of curing period, appreciable differences in the degree of vulcanization occur as a result of the impaired heat transfer from the mold to the camelback material. Such an irregularly vulcanized tire is subject to more rapid abrasion and road wear.

Camelback as herein used is meant to include any of the vulcanizable tread-forming compositions applied to new or used tire bodies. Such compositions ordinarily include natural or synthetic rubber and may even include minor amounts of synthetic or natural resins. The invention is applicable to any heat plastic moldable material suitable for forming the tread portion of a vehicle tire.

The type of serrations used is not restricted to the type shown in Fig. 2 which extend circumferentially in relation to the tire tread surface. In Fig. 2 a section of camelback 25 is shown having serrations or longitudinal ribs 36 on the side which is subjected to the retread mold face during the vulcanization and tread-forming period. The other side is caused to adhere to the tire body 24 and its tackiness is preserved until the camelback 25 is placed on the tire body 24 by a removable coated fabric 37 such as holland cloth or a varnished fabric. A great deal of variation is possible in the selection of the design used to subserve the objects of this invention. While the use of the longitudinal ribs 36 are preferred for most tread designs, it is conceivable that transverse or diagonally disposed ribs or serrations might more effectively permit free flow of camelback in the molding of other tread designs.

Wide variation in the height and number per inch of the serrations, as well as the incorporation of artistic designs, such as, circles, diamonds, squares, letters, numbers, etc., will become obvious to persons skilled in the art without departure from the spirit and scope of the present invention.

What is claimed is:

1. An improved camelback material comprising a ribbon-like member of uncured rubber composition having a planate surface adapted for continuous engagement with the tread surface of a tire, and a serrated surface adapted for compressive engagement with the tread area of a retreading mold during a recapping operation.

2. An improved tire building material comprising an elongate ribbon-like element of rubber or rubber-like material, said material being at least partially uncured, said ribbon being provided with a planate surface adapted to be applied to a tread surface of a pneumatic tire and an opposite surface adapted to be engaged by a mold, said opposite surface being provided throughout a substantial area thereof with a series of contiguously disposed ribs, said ribs extending longitudinally of said ribbon-like material in mutually spaced parallel relation.

3. An improved tread-forming material for retreading tires comprising an element of uncured rubber or rubber-like material provided with a serrated surface adapted for compressive engagement with the tread area of a retreading mold during a retreading operation.

4. An improved tread-forming material for retreading tires comprising an uncured thermoplastic element having a planate surface adapted for contiguous engagement with the tread surface of a tire and a serrated surface on the opposite side of the tread-forming material adapted for compressive engagement with the tread area of a retreading mold during a retreading operation on a tire.

5. An improved tread-forming material for retreading tires comprising an uncured element of plastic material provided with a non-planate surface adapted for compressive engagement with a tread forming member of a retreading mold to provide escapement of air during a retread operation.

THOMAS Q. SMITH.

REFERENCES CITED

The following references are of record in the file of this patent:

UNITED STATES PATENTS

| Number | Name | Date |
|---|---|---|
| 660,976 | Swanson | Oct. 30, 1900 |
| 1,341,121 | Gates | May 25, 1920 |
| 1,597,432 | Conant | Aug. 24, 1926 |
| 1,641,499 | Milford | Sept. 6, 1927 |
| 1,989,402 | Cupp | Jan. 29, 1935 |
| 2,116,008 | Block | May 3, 1938 |